Sept. 2, 1952 H. B. LAW 2,609,429

SEMICONDUCTION ELECTRODE CONSTRUCTION

Filed July 29, 1950

INVENTOR
HAROLD B. LAW
BY H. C. Olleston
ATTORNEY

Patented Sept. 2, 1952 2,609,429

UNITED STATES PATENT OFFICE 2,609,429

SEMICONDUCTION ELECTRODE CONSTRUCTION

Harold B. Law, Princeton, N. J., assignor to Radio Corporation of America, a corporation of Delaware Application July 29, 1950, Serial No. 176,721

12 Claims. (Cl. 175—366)

This invention relates generally to semi-conductor devices, and particularly relates to the construction and relation of the rectifying electrodes of a semi-conductor circuit element.

A semi-conductor device or circuit element comprises a semi-conducting body such, for example, as a silicon or germanium crystal and a base electrode, an emitter electrode and a collector electrode in contact with the crystal. The base electrode is in low-resistance contact with the crystal and may, for example, consist of a suitable metal such, for example, as brass which may be soldered to the crystal to provide a large-area contact therewith. However, it is not essential that the base electrode be in large-area contact with the crystal as long as it is in low-resistance contact with the crystal so that its potential determines the potential of the crystal. The emitter and collector electrodes are in rectifying contact with the crystal. Usually the emitter and collector consists of fine pointed wires which are in small-area contact with the crystal. However, it is also feasible to provide line contacts with the crystal (which are essentially small-area contacts) by pressing, for example, a wire against a flat surface of the semi-conducting crystal.

A semi-conductor circuit element of this type is usually called a transistor. When it is used in an amplifier or oscillator circuit, operating potentials must be applied to the electrodes. To this end a potential in the forward direction is impressed between emitter and base and a potential in the reverse direction is applied between collector and base. Assuming that the crystal is of the N type, the emitter should be positive and the collector negative with respect to the base. If the crystal should be of the P type, the potentials must be reversed.

In a conventional transistor the distance between the emitter and collector electrodes is of the order of two mils and this distance is critical because it determines the gain as well as other electrical characteristics of the device. In some cases, it is also necessary to provide more than two rectifying electrodes. Thus, the patent to Rack, 2,476,323, granted on July 19, 1949 discloses a transistor modulator which may have two or more emitter electrodes, that is, three or more rectifying electrodes. For such a modulator the various rectifying electrodes should be equally spaced from each other which presents considerable practical difficulties, particularly in view of the fact that the distance between two of the electrodes is very small.

It is accordingly an object of the present invention to provide a semi-conductor circuit element wherein the position of the rectifying electrodes with respect to the semi-conducting crystal and their distance from each may accurately be defined or predetermined.

A further object of the invention is to provide a semi-conductor device adapted for use in an amplifier, oscillator or modulator circuit where two or more rectifying electrodes may be positioned accurately at predetermined small distances from each other.

A semi-conductor device in accordance with the present invention is provided with a semi-conducting body having at least two surfaces which intersect each other at an angle. The semi-conducting body or crystal is disposed in a suitable opening or aperture extending through an insulating member . The rectifying electrodes preferably consist of fine wires having a chisel or blunt knife edge point. These wires are forced against the wall of the aperture in the insulating member and against the inclined surfaces of the crystal. In this manner the distance between the contact points of the rectifying electrodes with the crystal is determined by the dimensions of the aperture in the insulating member, by the diameter of the wires and by the angle between the inclined surfaces of the crystal.

The aperture in the insulating member may have a circular cross-section or a square cross-section. In the latter case, the wires preferably extend along the corners of the aperture. It is also feasible to provide an aperture of triangular or generally of polygonal cross-section in which case three or more rectifying electrodes may be positioned with respect to the crystal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1, 2, 3, 4, 5, 6:
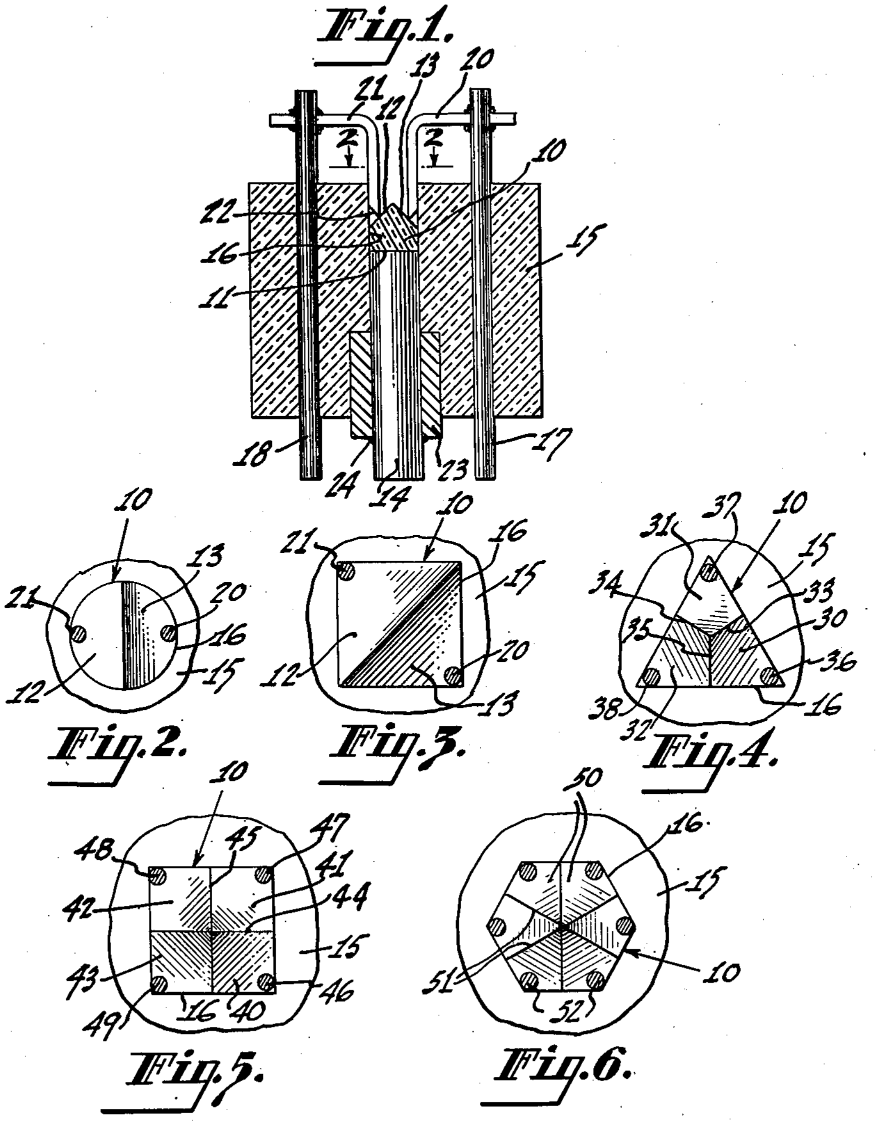
Figure 1 is an elevational view, partly in section, of a semi-conductor device or circuit element embodying the present invention.
Figure 2 is a sectional view, on enlarged scale, taken on line 2—2 of Figure 1 and illustrating particularly the inclined surfaces of the semi-conductor crystal.
Figures 3 to 6 are further fragmentary plan views, partly in section and similar to Figure 2, of modifications of the semi-conductor device of the invention.

Referring now to the drawing, in which like components have been designated by the same reference numerals throughout the figures, and particularly to Figures 1 and 2, there is illustrated a semi-conductor device or circuit element in accordance with the invention which comprises a semi-conducting body or crystal 10. Crystal 10 has a lower surface 11 and two upper surfaces 12 and 13 which intersect each other at an angle. As clearly shown in Figure 2, crystal 10 has a substantially circular cross-section. Crystal 10 is mounted on or supported by wire 14 which may, for example, have a diameter of 10 mils equal to that of crystal 10. Supporting wire 14 may, for example, consist of brass or another good conductor of electricity and may be soldered to the lower surface 11 of crystal 10 thereby to provide a low-resistance contact with the crystal. It will accordingly be obvious that supporting wire 14 serves as the base electrode of crystal 10.

Crystal 10 preferably is disposed in an insulating block or member 15 which may, for example, consist of Bakelite. Insulating block 15 is provided with an aperture 16 extending therethrough which may be of circular cross-section as clearly shown in Figure 2. Supporting wires 17 and 18 extend through insulating block 15 parallel with aperture 16. Block 15 may be molded about wires 17, 18.

The rectifying electrodes 20 and 21 consist of fine wires of tungsten or Phosphor bronze, for example, and are soldered or otherwise secured to the upper ends of supporting wires 17 and 18 as shown. The free ends of wires or electrodes 20 and 21 are provided with a chisel point or a blunt knife edge as shown at 22. Wires 20 and 21 may, for example, have a diameter of approximately 4 mils.

The device illustrated in Figures 1 and 2 may be assembled as follows: At first, electrodes 20 and 21 are secured to supporting wires 17 and 18 and their free ends are bent so that the wires 20, 21 extend into aperture 16 along its wall on opposite sides thereof. Thereafter, crystal 10 is secured to its support 14 and pushed upwards against electrodes 20 and 21. Eventually, the chisel points 22 of electrodes 20 and 21 are wedged between the inclined surfaces 12, 13 of crystal 10 and the wall of aperture 16. Crystal 10 and its supporting wire 14 may be held in place by means of a metallic insert 23 which is provided in and secured to insulating block 15. As shown at 24, supporting wire 14 may be soldered to insert 23 to maintain the crystal in its desired position. Thus, it will readily be seen that the diameter of aperture 14, the diameter of electrodes 20, 21 and the angle which inclined surfaces 12, 13 form with the aperture define the distance between the contact points of electrodes 20, 21 with surfaces 12 and 13.

In the device of Figures 1 and 2 supporting wire 14 forms the base electrode and wires 20, 21 constitute the emitter and collector electrodes. It will be understood that the particular position of base electrode 14 is immaterial as long as it is in low-resistance contact with crystal 10 and therefore controls the potential of the bulk of crystal 10. A preferred embodiment of the present invention is shown in Figure 3. Crystal 10 is of square cross-section as clearly shown and aperture 16 in insulating block 15 also has a square cross-section. The inclined surfaces 12 and 13 have a common boundary line along which they intersect each other which passes through two corners of the square. Electrodes 20 and 21 extend along the other corners of aperture 16. It will accordingly be readily seen that the position of the electrodes 20 and 21 is defined even better because they extend along the corners of aperture 16 in insulating block 15.

Another modification of the semi-conductor device of the invention is illustrated in Figure 4. This modification permits to position three rectifying electrodes in such a manner that their distances from each other are equal. To this end crystal 10 is of triangular cross-section as clearly shown. It is provided with three sloping surfaces 30, 31 and 32 which intersect each other along three lines 33, 34 and 35 which are disposed at right angles to the three sides of the triangle which forms the outline of crystal 10. The three electrodes are shown at 36, 37 and 38 and extend along the three corners of the triangular aperture 16. Two of the electrodes 36, 37 and 38 may, for example, be used as emitter electrodes to provide a modulator as disclosed in the Rack patent previously referred to.

As shown in Figure 5, crystal 10 may have a square cross-section and four intersecting sloping surfaces 40, 41, 42 and 43. The four surfaces 40 to 43 intersect each other along two lines 44 and 45 arranged at right angles to each other and to the four lines which form the outline of crystal 10. Four electrodes 46, 47, 48 and 49 are arranged along the four corners of aperture 16.

As illustrated in Figure 6, it is also feasible to provide a crystal 10 of hexagonal cross-section or generally of polygonal cross-section. The crystal is now provided with six sloping surfaces indicated at 50. The six sloping surfaces again intersect each other along six lines shown at 51 which are at right angles to the six lines forming the outline of the crystal. Six electrodes indicated at 52 may be provided at the six corners of aperture 16.

It will be understood that the different sloping surfaces of crystal 10 illustrated in Figures 2 to 6 may readily be obtained by grinding a crystal to the desired shape. If crystal 10 has a square, triangular or hexagonal shape, supporting wire 14 may have the same cross-section as the crystal. Alternatively, supporting wire 14 may have a circular cross-section and the aperture 16 may have a shape and width so that wire 14 may readily be moved through the aperture. In the modifications shown in Figures 3 to 6 the rectifying electrodes are accurately positioned by the corners of aperture 16.

There has thus been disclosed an improved construction for the rectifying electrodes of a semi-conductor device or circuit element. Two, three or more rectifying electrodes may be provided and their distances may be predetermined and may be made equal. The contacts between the rectifying electrodes and the crystal are substantially point contacts due to the fact that the electrodes are provided with blunt knife edges or chisel points. It will be appreciated that the electrode arrangement and construction described, permits any desired number of contacts to be made with a body of semi-conducting material without resorting to complicated electrode holding means or any enlargement of the body.

What is claimed is:

1. A semi-conductor device comprising a semi-conducting body having at least two surfaces intersecting each other at an angle and a further surface, a metallic support in low-resistance contact with the further surface of said body, an insulating member having an aperture forming an inner surface and adapted to receive said body and said support, a pair of metallic elongated electrodes extending into said aperture, each of said electrodes having a point, and means for pressing each of said electrodes with the point individually against one of said two intersecting surfaces of said body and with said electrodes extending each along and against a predetermined portion of the inner surface of said member to define the distance between their contact areas with said body.

2. A semi-conductor device comprising a semi-conducting body having at least two surfaces intersecting each other at an angle and a further surface, a metallic support in low-resistance contact with the further surface of said body, an insulating member having an elongated aperture forming an inner surface and extending therethrough and adapted to receive said body and said support, said two intersecting surfaces sloping inwardly of said aperture and toward the inner surface thereof, a pair of metallic rod-like electrodes protruding into said aperture, each of said electrodes having a chisel point, and means for pressing each of said electrodes with the chisel point individually against one of said two intersecting surfaces and with said electrodes extending each along and against a predetermined portion of the inner surface of said member to define the distance between their contact points with said intersecting surfaces.

3. A semi-conductor device comprising a semi-conducting body having a first surface and at least two further surfaces intersecting each other at an angle, a metallic support in low-resistance contact with the first surface of said body, an insulating member having an elongated opening extending therethrough and adapted to receive said support and said body, said further surfaces sloping inwardly of said opening and toward the wall thereof, a pair of electrodes, each consisting of a conductive wire extending into said aperture and having a point, and means for pressing said electrodes against said further surfaces and with said electrodes positioned along and against the wall of the aperture in said member to define the distance between the contact areas of said electrodes with said further surfaces.

4. A semi-conductor device comprising a semi-conducting body having a lower surface and at least two upper surfaces intersecting each other at an angle, a metallic support in low-resistance contact with the lower surface of said body, an insulating member having an elongated opening extending therethrough and adapted to receive said support and said body, said two intersecting surfaces sloping inwardly of said opening and toward the wall thereof, a pair of electrodes, each consisting of a metallic wire having a chisel point, and means for pressing said electrodes against said upper surfaces and with said electrodes extending along and against the wall of the aperture in said member to define the distance between the contact points of said electrodes with said upper surfaces.

5. A device as claimed in claim 3 wherein said opening, said body and said support are of substantially circular cross-section.

6. A semi-conducting device comprising a semi-conducting body having a substantially square cross-section with a lower surface and at least two upper surfaces intersecting each other at an angle, a metallic support in low-resistance contact with said lower surface, an insulating member having an elongated opening therethrough of substantially square cross-section and of a size to receive said body and said support, said upper surfaces sloping inwardly of said opening and toward the wall thereof, a pair of electrodes, each consisting of a metallic wire having a point, and means for guiding said electrodes along predetermined corners of said opening and for pressing them toward said inclined surfaces, whereby said electrodes are wedged between said upper surfaces and said corners to determine the distance between their contact points with said upper surfaces.

7. A semi-conducting device comprising a semi-conducting body having a substantially square cross-section with a lower surface and two upper surfaces intersecting each other at an angle along a line connecting two corners of said square, a metallic support in low-resistance contact with said lower surface, an insulating member having an elongated opening therethrough of substantially square cross-section and of a size to receive said body and said support, said upper surfaces sloping inwardly of said opening and toward the wall thereof, a pair of electrodes, each consisting of a fine metallic wire having a knife edge point, and means for guiding said electrodes along the corners of said aperture opposite said line and for pressing them toward said inclined surfaces with said points facing said lines, whereby said electrodes are wedged between said upper surfaces and opposite said line to define the distance between their rectifying contact points with said upper surfaces.

8. A semi-conducting device comprising a semi-conducting body having a substantially square cross-section with a lower surface and four upper surfaces intersecting each other at an angle along two lines at right angles to the sides of said square, a metallic support in low-resistance contact with said lower surface, an insulating member having an elongated opening therethrough of substantially square cross-section and of a size to receive said body and said support, said upper surfaces sloping inwardly of said opening and toward the wall thereof, four electrodes, each consisting of a fine metallic wire having a chisel point, and means for guiding each of said electrodes along a corner of said aperture and for pressing said electrodes toward said inclined surfaces with said chisel points facing the intersection of said lines, whereby said electrodes are wedged between said upper surfaces and said corners to determine the distance between their substantially point-like rectifying contacts with said upper surfaces.

9. A semi-conductor device comprising a semi-conducting body of substantially triangular cross-section having a lower surface and three upper surfaces intersecting each other along three lines substantially perpendicular to the sides of the triangle forming the outline of said body, a metallic support soldered to the lower surface of said body, an insulating member having an elongated aperture therein, said upper surfaces sloping inwardly of said aperture and toward the wall thereof, said aperture having a portion with a triangular cross-section to receive said body and another portion to receive said support, three fine wires each having a chisel point, and means for positioning each of said wires along one of the corners of the triangular portion of said aperture and for pressing it against one of the upper surfaces of said body, thereby to define the distances between the substantially point-like rectifying contacts between said wires and the upper surfaces of said body.

10. A semi-conductor device comprising a semiconducting body of polygonal cross-section having a lower surface and a plurality of upper surfaces intersecting each other along lines substantially perpendicular to the sides of the polygon forming the outline of said body, a metallic support soldered to the lower surface of said body, an insulating member having an elongated aperture therein, said upper surfaces sloping inwardly of said aperture and toward the wall thereof, said aperture having a portion with a polygonal cross-section to receive said body and another portion to receive said support, a number of fine wires not exceeding the number of said upper surfaces, each of said wires having a chisel point, and means for positioning each of said wires along a corner of the polygonal portion of said aperture and for pressing it against one of the upper surfaces of said body, thereby to define the distances between the substantially point-like rectifying contacts between said wires and the upper surfaces of said body.

11. A semi-conductor device comprising a semiconducting body of substantially hexagonal cross-section having a lower surface and six upper surfaces intersecting each other along three lines substantially perpendicular to the sides of the hexagon forming the outline of said body, a metallic support soldered to the lower surface of said body, an insulating member having an elongated aperture therein, said upper surfaces sloping inwardly of said aperture and toward the wall thereof, said aperture having a portion with a hexagonal cross-section to receive said body and another portion to receive said support, a number of fine wires not exceeding six, each wire having a chisel point, and means for positioning each of said wires along a corner of the hexagonal portion of said aperture and for pressing it against one of the upper surfaces of said body, thereby to define the distances between the substantially point-like rectifying contacts between said wires and the upper surfaces of said body.

12. A semi-conducting device comprising a semi-conducting body having a cross section forming at least three substantially straight intersecting lines to provide at least three corners, said body having a lower surface and a plurality of upper surfaces intersecting each other, each of said upper intersecting surfaces sloping towards one of said corners, a metallic support in low-resistance contact with said lower surface, an insulating member having an elongated opening therethrough, said opening having a cross section of substantially the same shape as that of said body and of a size to receive said body and support, a pair of electrodes, each consisting of a metallic filament having a point, and means for guiding said electrodes along predetermined corners of said opening and for pressing them toward said upper intersecting surfaces, whereby said electrodes are wedged between said upper intersecting surfaces and the corners of said opening to determine the distance between their contact points with said body.

HAROLD B. LAW.

REFERENCES CITED

The following references are of record in the file of this patent:

UNITED STATES PATENTS

| Number | Name | Date |
|---|---|---|
| 2,584,461 | James et al. | Feb. 5, 1952 |
| 2,595,475 | McLaughlin | June 6, 1952 |